(12) United States Patent
Shishido

(10) Patent No.: US 10,620,512 B2
(45) Date of Patent: Apr. 14, 2020

(54) PROJECTOR

(71) Applicant: SEIKO EPSON CORPORATION, Tokyo (JP)

(72) Inventor: Yoichi Shishido, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/899,854

(22) Filed: Feb. 20, 2018

(65) Prior Publication Data

US 2018/0246398 A1 Aug. 30, 2018

(30) Foreign Application Priority Data

Feb. 28, 2017 (JP) .................................. 2017-035978

(51) Int. Cl.
*G03B 21/00* (2006.01)
*G02B 27/09* (2006.01)
*G03B 21/20* (2006.01)

(52) U.S. Cl.
CPC ....... *G03B 21/006* (2013.01); *G02B 27/0944* (2013.01); *G03B 21/206* (2013.01); *G03B 21/2033* (2013.01); *G03B 21/2053* (2013.01); *G03B 21/2073* (2013.01); *G03B 21/2093* (2013.01)

(58) Field of Classification Search
CPC .............. G03B 21/006; G03B 21/2033; G02B 27/0944
USPC ......................................................... 353/98
See application file for complete search history.

(56) References Cited

U.S. PATENT DOCUMENTS

| | | | |
|---|---|---|---|
| 7,922,338 B2 | 4/2011 | Matsumoto et al. | |
| 8,064,114 B2 | 11/2011 | Facius | |
| 8,157,384 B2 | 4/2012 | Kanai et al. | |
| 8,992,029 B2 | 3/2015 | Taniguchi et al. | |
| 9,609,294 B2 | 3/2017 | Taniguchi et al. | |
| 2002/0093737 A1 | 7/2002 | Itoh et al. | |
| 2008/0247016 A1 | 10/2008 | Facius | |
| 2008/0291343 A1* | 11/2008 | Maeda | G03B 33/12 348/759 |
| 2009/0040753 A1 | 2/2009 | Matsumoto et al. | |
| 2009/0109349 A1 | 4/2009 | Kanai et al. | |
| 2012/0002172 A1 | 1/2012 | Ikeda et al. | |
| 2013/0229628 A1* | 9/2013 | Akiyama | G02B 27/283 353/20 |
| 2014/0118702 A1 | 5/2014 | Taniguchi et al. | |
| 2014/0363162 A1 | 12/2014 | Chu et al. | |

(Continued)

FOREIGN PATENT DOCUMENTS

| | | | | |
|---|---|---|---|---|
| JP | H08-304739 A | | 11/1996 | |
| JP | 2006017931 | * | 1/2006 | ............... G02B 5/18 |

(Continued)

OTHER PUBLICATIONS

Translation of JP 2006017931 (Year: 2019).*

*Primary Examiner* — Jerry L Brooks
(74) *Attorney, Agent, or Firm* — Oliff PLC

(57) ABSTRACT

A projector includes: a solid-state light source; a diffractive element that dynamically controls diffraction of light from the solid-state light source; a light modulator that modulates, in response to image information, diffracted light emitted from the diffractive element to generate image light; and a projection optical system that projects the image light.

7 Claims, 13 Drawing Sheets

(56) References Cited

U.S. PATENT DOCUMENTS

| | | | | |
|---|---|---|---|---|
| 2015/0124225 A1* | 5/2015 | Akiyama | ........... | G02B 19/0057 |
| | | | | 353/31 |
| 2015/0163467 A1 | 6/2015 | Taniguchi et al. | | |
| 2016/0033853 A1* | 2/2016 | Akiyama | ........... | G03B 21/2013 |
| | | | | 353/38 |

FOREIGN PATENT DOCUMENTS

| JP | 2008-15064 A | 1/2008 |
|---|---|---|
| JP | 2008-257238 A | 10/2008 |
| JP | 2009-42637 A | 2/2009 |
| JP | 2009-282472 A | 12/2009 |
| JP | 2012-13891 A | 1/2012 |
| JP | 2012-181531 A | 9/2012 |
| JP | 2013-92788 A | 5/2013 |
| JP | 2013-195791 A | 9/2013 |
| JP | 2015-509215 A | 3/2015 |

* cited by examiner

PROJECTOR

BACKGROUND

1. Technical Field

The present invention relates to a projector.

2. Related Art

In the related art, some projectors include a polarization conversion optical system that converts the polarization direction of light incident on a liquid crystal panel to a predetermined direction (e.g., see JP-A-8-304739).

However, the technique in the related art employs a structure in which light is absorbed by a polarizer on the light exiting side of the liquid crystal panel in black displays thereby failing to effectively use light. Therefore, it is desired to provide a new technique by which high light-use efficiency can be obtained.

SUMMARY

An advantage of some aspects of the invention is to provide a projector capable of obtaining high light-use efficiency.

According to an aspect of the invention, a projector is provided. The projector includes: a solid-state light source; a diffractive element that dynamically controls diffraction of light from the solid-state light source; a light modulator that modulates, in response to image information, diffracted light emitted from the diffractive element to generate image light; and a projection optical system that projects the image light.

According to the projector according to the aspect, the light from the solid-state light source is dynamically redistributed according to a display image by the diffractive element, thereby making it possible to effectively use, as the image light, a component that is absorbed by a polarizer in the related art. Thus, high light-use efficiency can be realized.

In the aspect, it is preferable that the projector further includes a collimating lens that is disposed on an optical path between the solid-state light source and the diffractive element and collimates the light from the solid-state light source.

According to this configuration, the light converted to parallel light by the collimating lens can be incident on the diffractive element. With this configuration, the shift of a diffraction image is reduced, and therefore, a predetermined region of the light modulator can be illuminated by the diffracted light.

In the aspect, it is preferable that the solid-state light source includes a rectangular light emitting region, that a emission angle in a long-side direction of the light emitting region is smaller than a emission angle in a short-side direction of the light emitting region, and that the collimating lens includes a first lens surface corresponding to the long-side direction of the light emitting region and a second lens surface corresponding to the short-side direction of the light emitting region.

According to this configuration, light emitted from the light emitting region where the emission angle in the long-side direction is different from that in the short-side direction can be favorably collimated.

In the aspect, it is preferable that a focal length of the first lens surface is longer than a focal length of the second lens surface.

Further, it is desirable that when a light incident region of the diffractive element is rectangular, the solid-state light source and the diffractive element are disposed such that the short-side direction of the light emitting region coincides with a short-side direction of the light incident region.

According to this configuration, it is possible to cause incident light to be favorably incident on the diffractive element while reducing the field angle of the light incident on the diffractive element to 0.03 degrees or less. Thus, a predetermined region of the light modulator can be illuminated with a desired diffraction pattern by reducing the shift of a diffraction image.

In the aspect, it is preferable that the projector includes a plurality of the solid-state light sources, and that the plurality of solid-state light sources are arranged at least along the short-side direction of the light emitting region.

According to this configuration, it is possible to improve output of incident light incident on the diffractive element while reducing the field angle of the light incident on the diffractive element to 0.03 degrees or less.

In the aspect, it is preferable that the plurality of solid-state light sources are arranged along the short-side direction and the long-side direction of the light emitting region, and that the number of the solid-state light sources arranged in the short-side direction is larger than the number of the solid-state light sources arranged in the long-side direction.

According to this configuration, it is possible to further improve output of incident light incident on the diffractive element while reducing the field angle of the light incident on the diffractive element.

In the aspect, it is preferable that the diffractive element includes a reflective liquid crystal device, and that when the light from the solid-state light source is obliquely incident on a light incident region of the diffractive element, the thickness of a liquid crystal layer of the reflective liquid crystal device is set such that a phase difference in light passing through the liquid crystal layer during power-on and power-off is $2\pi$.

According to this configuration, the diffractive element can adjust the phase difference within the range from 0 to $2\pi$ in each diffraction region also for incident light obliquely incident on the diffractive element. With this configuration, the diffraction angle can be accurately controlled in each diffraction region.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
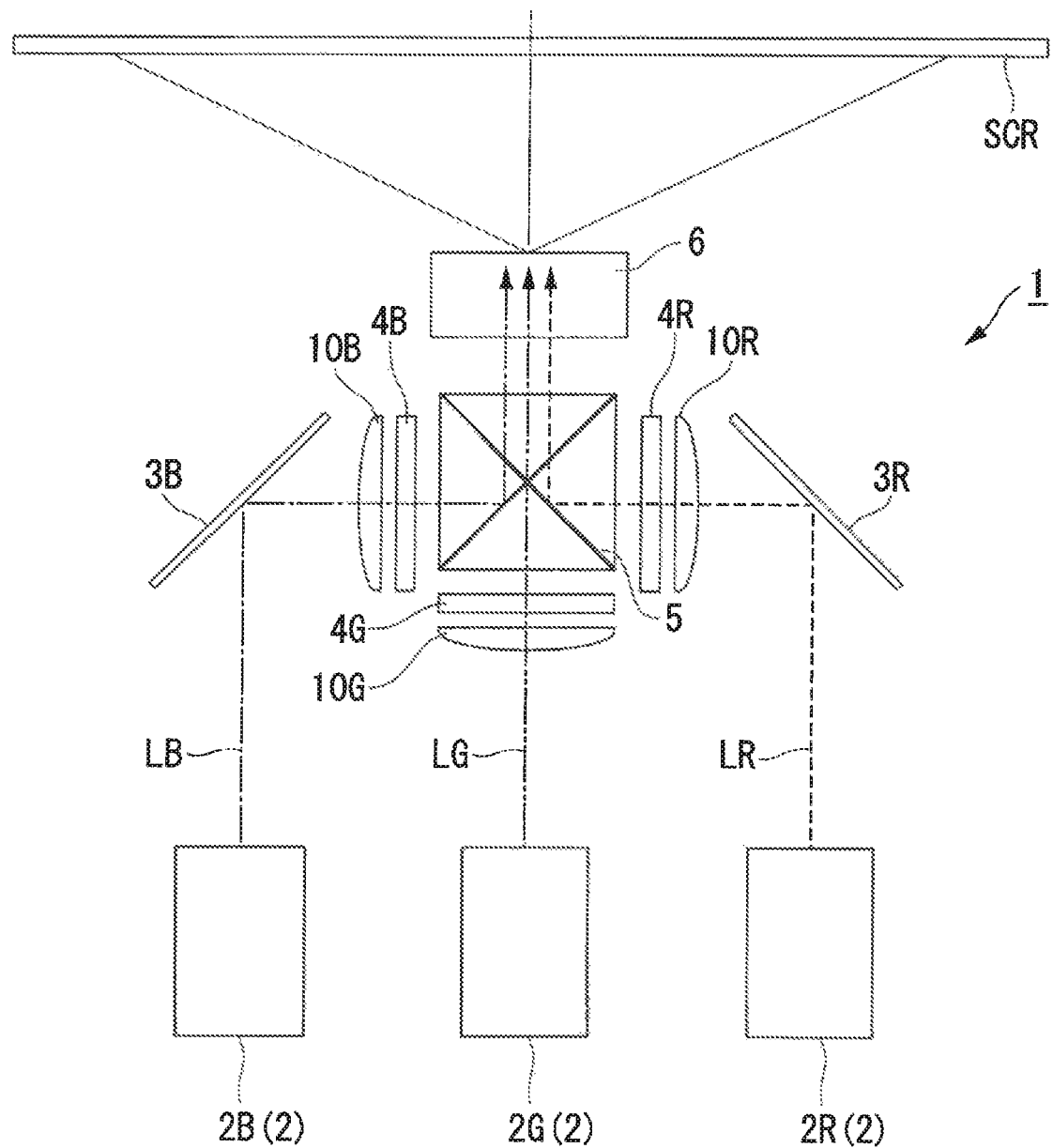
FIG. 1 is a schematic configuration diagram showing a projector of a first embodiment.

Hereinafter, embodiments of the invention will be described in detail with reference to the drawings.

In the drawings used in the following description, as a matter of convenience, a characteristic portion may be shown in an enlarged manner for clarity of the characteristic, and thus the dimension ratio and the like of each component are not always the same as actual ones.

First Embodiment

FIG. 1 is a schematic configuration diagram showing a projector of a first embodiment.

As shown in FIG. 1, the projector 1 includes a first illumination device 2R, a second illumination device 2G, a third illumination device 2B, mirrors 3R and 3B, a light modulator 4R, a light modulator 4G, a light modulator 4B, a light combining optical system 5, and a projection optical system 6.

The first illumination device 2R emits red light LR. The second illumination device 2G emits green light LG. The third illumination device 2B emits blue light LB. The mirror 3R reflects the red light LR toward the light modulator 4R. The mirror 3B reflects the blue light LB toward the light modulator 4B. The light modulator 4R, the light modulator 4G, and the light modulator 4B respectively modulate the red light LR, the green light LG, and the blue light LB in response to image information to form image lights of the respective colors.

In the embodiment, each of the light modulator 4R, the light modulator 4G, and the light modulator 4B includes a liquid crystal panel. The light modulator 4R, the light modulator 4G, and the light modulator 4B respectively modulate the red light LR, the green light LG, and the blue light LB in response to image information while transmitting the red light LR, the green light LG, and the blue light LB, and form image lights corresponding to the respective colors. Polarizers (not shown) are respectively disposed on the light incident and light exiting sides of each of the light modulator 4R, the light modulator 4G, and the light modulator 4B.

A field lens 10R, a field lens 10G, and a field lens 10B that respectively collimate the red light LR, the green light LG, and the blue light LB, which are respectively incident on the light modulator 4R, the light modulator 4G, and the light modulator 4B, are provided on the light incident sides of the light modulator 4R, the light modulator 4G, and the light modulator 4B.

The light combining optical system 5 includes a cross dichroic prism. The light combining optical system 5 combines the image lights of the respective colors from the light modulator 4R, the light modulator 4G, and the light modulator 4B, and emits the combined image light toward the projection optical system 6.

The projection optical system 6 includes a projection lens group. The projection optical system 6 enlarges and projects the image light combined by the light combining optical system 5 onto a screen SCR. With this configuration, an enlarged color video (image) is displayed on the screen SCR.

Subsequently, the configurations of the first illumination device 2R, the second illumination device 2G, and the third illumination device 2B will be described. The basic configurations of the first illumination device 2R, the second illumination device 2G, and the third illumination device 2B are the same, except that the colors of illumination lights are different. In the following, the first illumination device 2R, the second illumination device 2G, and the third illumination device 2B are referred collectively to as "illumination devices 2", and the configuration of the illumination device 2 will be described.

Figure 2:
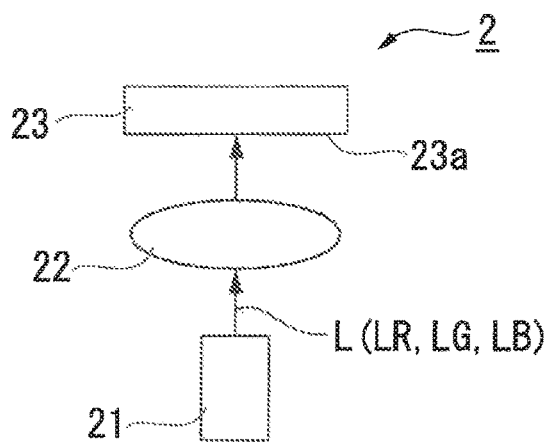
FIG. 2 is a diagram showing a schematic configuration of an illumination device.

FIG. 2 is a diagram showing a schematic configuration of the illumination device 2.

As shown in FIG. 2, the illumination device 2 includes a solid-state light source 21, a collimating lens 22, and a diffractive element 23.

In the embodiment, the solid-state light source 21 includes a laser diode that emits light 1 composed of laser light such as the red light LR, the green light LG, or the blue light LB. The collimating lens 22 converts the light L to parallel light and causes the light L to be incident on the diffractive element 23. The diffractive element 23 includes a light incident region (light incident surface) 23a on which the light L is incident. The planar shape of the light incident region 23a is rectangular. In the embodiment, the size of the light incident region 23a of the diffractive element 23 in the short-side direction is 4.0 mm, and the size of the light incident region 23a in the long-side direction is 6.4 mm. The diffractive element 23 dynamically controls diffraction of the light from the collimating lens 22.

First, the configuration of the diffractive element 23 will be described. The solid-state light source 21 and the collimating lens 22 will be described in detail later.

The diffractive element 23 includes a plurality of regions on which the light L from the collimating lens 22 is incident, and changes the traveling direction of the light L in each of the regions in response to a control signal. In the embodiment, the diffractive element 23 includes a diffractive optical element (DOE), and, for example, includes a liquid crystal panel in which liquid crystal molecules are sealed between a pair of glass plates through a transparent electrode plate. In this case, a diffraction grating using the liquid crystal molecules is formed in each of the regions by applying a voltage through transparent electrodes in a predetermined pattern.

The number of pixel regions (hereinafter sometimes referred to as "diffraction regions") set in the diffractive element 23 is the same as the number of pixels of the liquid crystal panel constituting the light modulator 4R, 4G, or 4B. The number of pixel regions of the diffractive element 23 is not necessarily the same as the number of pixels of the liquid crystal panel constituting the light modulator 4R, 4G, or 4B, and may be different therefrom.

When a voltage is not applied to the diffraction region in the diffractive element 23, light transmitted through the diffraction region goes straight as it is, and is emitted onto the corresponding pixel of the light modulator 4R, 4G, or 4B. On the other hand, when a predetermined voltage is applied to the diffraction region, the light transmitted through the diffraction region is diffracted at a predetermined angle by the diffraction region and emitted onto a desired pixel.

In the embodiment, the diffractive element 23 is configured such that the diffraction angle through the diffraction region can be controlled by adjusting the voltage to be applied. The effect of diffraction by the diffractive element 23 efficiently appears as light is in a narrower wavelength band and has higher directivity. In the embodiment, the light L emitted from the solid-state light source 21 is laser light, and therefore, diffracted light can be incident on a predetermined region of the light modulator 4R, 4G, or 4B by controlling the voltage to be applied to each of the diffraction regions in the diffractive element 23.

Figure 3:
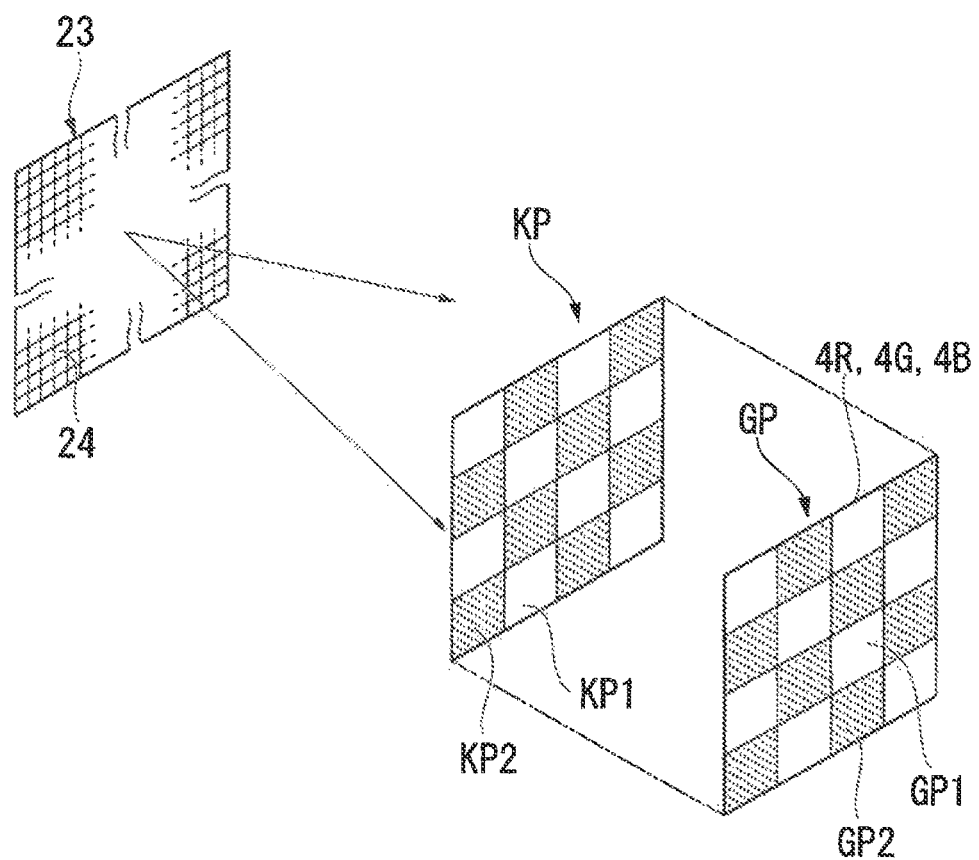
FIG. 3 is a diagram showing the correspondence relationship between diffraction regions of a diffractive element and a light modulator.

FIG. 3 is a diagram showing the correspondence relationship between the diffraction regions of the diffractive element 23 and the light modulator 4R, 4G, or 4B. In FIG. 3, it is assumed that an image pattern GP is formed in the image forming region of the light modulator 4R, 4G, or 4B. The image pattern GP includes, for example, a four-by-four checker pattern, and includes dark portions GP1 and bright portions GP2. Here, in the related, the dark portion GP1 is formed by absorbing light with a polarizer on the light exiting side.

As shown in FIG. 3, the diffractive element 23 controls the voltage to be applied to the plurality of diffraction regions 24, thereby forming a diffracted light pattern KP corresponding to the image pattern GP formed on the light modulator 4R, 4G, or 4B. The diffracted light pattern KP includes dark portions KP1 and bright portions KP2. The dark portion KP1 corresponds to the dark portion GP1 of the image pattern GP. The bright portion KP2 corresponds to the bright portion GP2 of the image pattern GP.

The dark portion KP1 of the diffracted light pattern KP is generated as a result of distributing, through diffraction, light incident on the entire region of the light incident region 23a of the diffractive element 23, to the bright portion KP2. Therefore, the diffractive element 23 diffracts light composed of a component (the dark portion GP1 of the image pattern GP) that is absorbed by the polarizer on the light exiting side of the light modulator 4R, 4G, or 4B in the related art, thereby effectively using the light as image light (the bright portion GP2 of the image pattern GP).

Figure 4:
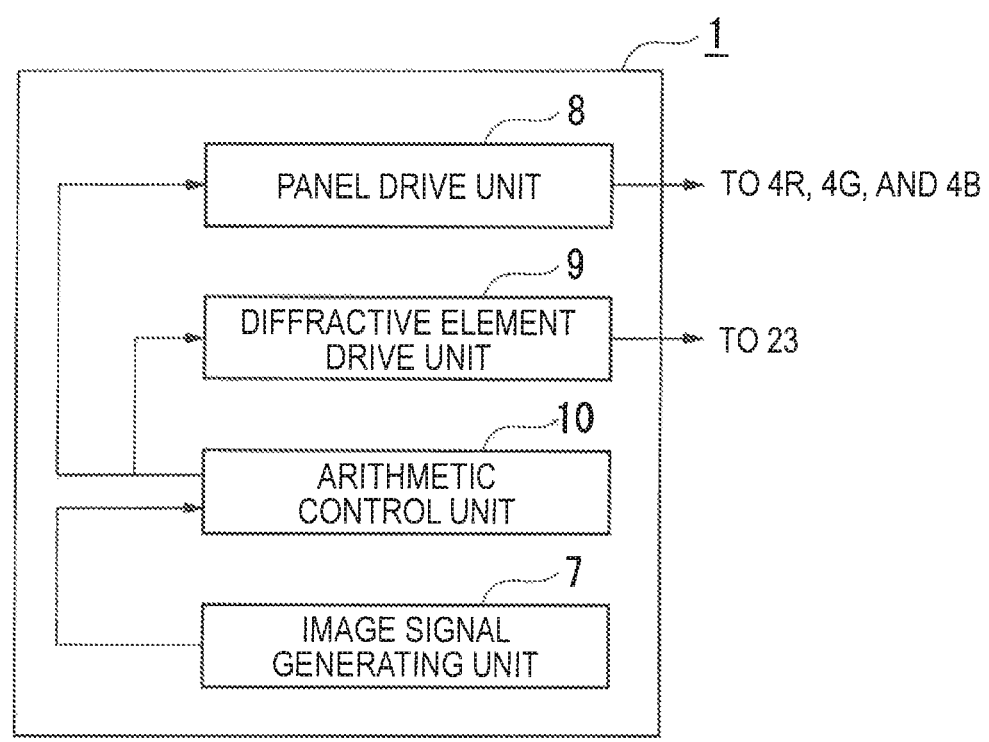
FIG. 4 is a circuit block diagram showing a circuit configuration of the projector.

FIG. 4 is a circuit block diagram showing a circuit configuration of the projector 1. As shown in FIG. 4, the projector 1 includes an image signal generating unit 7, a panel drive unit 8, a diffractive element drive unit 9, and an arithmetic control unit 10. The image signal generating unit 7 generates, based on input video signals, signals for the respective colors to respectively drive the light modulators 4R, 4G, and 4B, and supplies the drive signals to the arithmetic control unit 10. The arithmetic control unit 10 supplies the drive signals of the respective colors generated by the image signal generating unit 7 to the panel drive unit 8.

The panel drive unit 8 drives the light modulators 4R, 4G, and 4B in response to the supplied drive signals of the respective colors. The arithmetic control unit 10 obtains brightness information of pixels from a luminance signal of the input video signals, and calculates a diffracted light pattern (pattern for illuminating pixel regions to generate image light) formed by the diffractive element 23.

Then, the arithmetic control unit 10 drives the diffractive element drive unit 9 so as to form the calculated diffracted light pattern. The diffractive element drive unit 9 supplies, to the diffractive element 23, a control signal for controlling the voltage to be applied to each of the diffraction regions so as to form a diffracted light pattern for illuminating a predetermined pixel region of the light modulator 4R, 4G, or 4B.

Based on the configuration described above, the illumination device 2 of the embodiment dynamically redistributes illumination light according to a display image, thereby being capable of effectively using, as image light, the component absorbed by the polarizer in the related art. Thus, light emitted onto dark pixels in the light modulators 4R, 4G, and 4B is darkened, and also light emitted onto bright pixels is brightened; therefore, a high contrast image can be displayed.

Now, when light control is performed using the diffractive element 23, a problem arises in that a diffraction image shifts in proportion to the light incidence angle on the diffractive element 23. When the shift of the diffraction image occurs, diffracted light cannot be incident on a predetermined pixel region of the light modulator 4R, 4G, or 4B, thereby failing to generate a desired image on the light modulator 4R, 4G, or 4B and thus involving the risk of degrading image light.

In contrast, in the embodiment, the light L from the solid-state light source 21 is converted to parallel light using the collimating lens 22. With this configuration, the shift of the diffraction image is reduced by reducing the light incidence angle with respect to the diffractive element 23.

In general, a light emitting region of the solid-state light source 21 is rectangular, and the emission angle distribution varies in the vertical and horizontal directions. That is, the solid-state light source 21 has anisotropy in the emission angle distribution. The emission angle distribution of the solid-state light source 21 will be described below.

Figure 5:
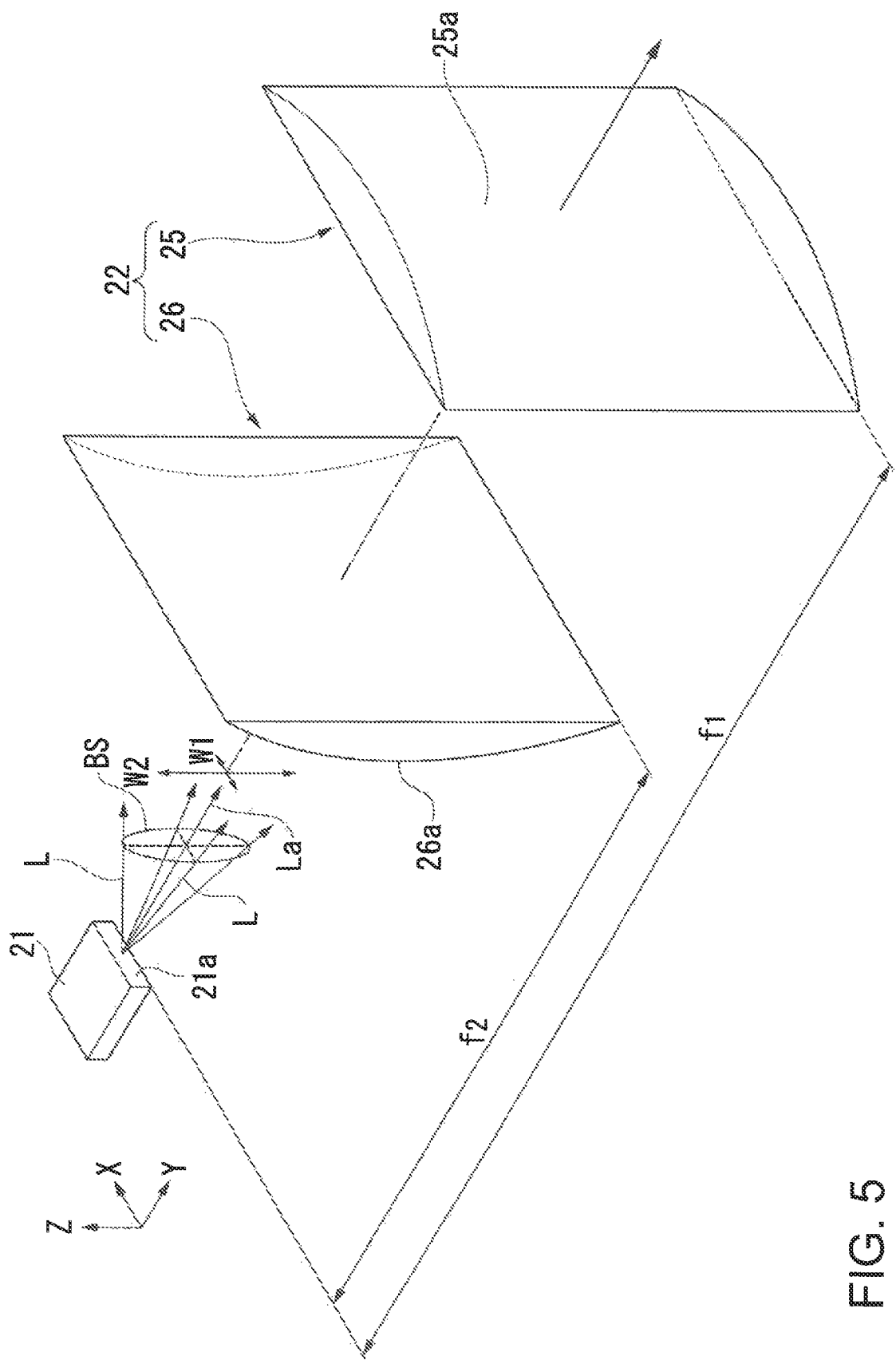
FIG. 5 is an explanatory view of an emission angle distribution of light emitted from a solid-state light source.

FIG. 5 is an explanatory view of the emission angle distribution of the light L emitted from the solid-state light source 21. In FIG. 5, the collimating lens 22 is also shown for convenience of description.

As shown in FIG. 5, the solid-state light source 21 includes the light emitting region 21a (light exiting surface) to emit light. The light emitting region 21a has a substantially rectangular planar shape having a long-side direction W1 and a short-side direction W2 as viewed in the direction of a principal ray La of the emitted light.

In the description using FIG. 5, an XYZ coordinate system is used for the description. In FIG. 5, the X-direction defines the long-side direction W1 of the light emitting region 21a; the Y-direction defines the direction of the principal ray of the light emitted from the light emitting region 21a; and the Z-direction is a direction orthogonal to the X-direction and the Y-direction, and defines the short-side direction W2 of the light emitting region 21a.

In the embodiment, the width of the light emitting region 21a in the long-side direction W1 is, for example, 40 μm, and the width of the light emitting region 21a in the snort-side direction W2 is, for example, 1 μm. However, the shape of the light emitting region 21a is not limited to this.

The light L emitted from the solid-state light source 21 is composed of linearly polarized light having a polarization direction parallel to the long-side direction W1. The spread of the light L in the short-side direction W2 is wider than the spread of the light L in the long-side direction W1. In the embodiment, the maximum value (maximum emission angle) of the spread angle (emission angle) of the light L in the long-side direction W1 is, for example, 9 degrees, and the maximum value (maximum emission angle) of the spread angle (emission angle) of the light L in the short-side direction W2 is, for example, 45 degrees. A cross-sectional shape BS of the light L is an elliptical shape with the short-side direction W2 being as a long-axis direction.

That is, the light L has anisotropy in the distribution of emission angle.

Figure 6:
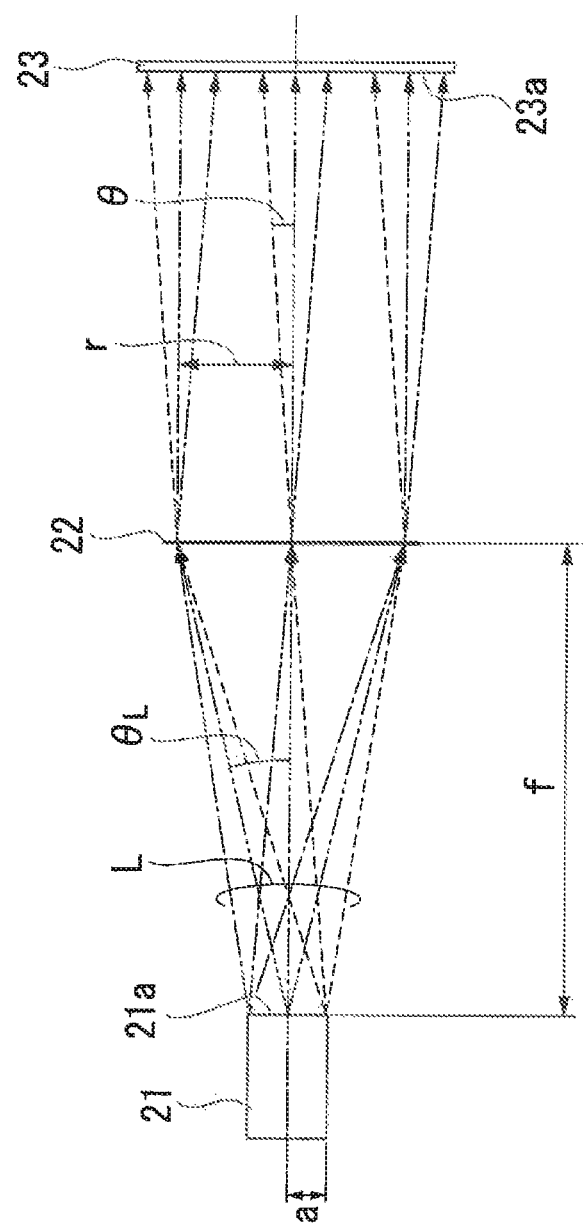
FIG. 6 is a diagram conceptually showing the field angle and beam diameter of light.

Here, the field angle and beam diameter of the light L incident on the diffractive element 23 can be calculated as follows. FIG. 6 is a diagram conceptually showing the field angle and beam diameter of the light L. In FIG. 6, a corresponds to the half-width of the emission point size (the size of the light emitting region 21a) of the solid-state light source 21; θ corresponds to the field angle (units of degrees (deg)) of the light L; W corresponds to the beam diameter of the light L; $\theta_L$ corresponds to the emission angle (maximum emission angle; units of degrees (deg)) of the light L; and f corresponds to the focal length of a lens surface of the collimating lens 22. The light emitting region 21a has a predetermined size, and therefore, the light emitted from the light emitting region 21a is collimated by the collimating lens 22 and does not overlap at one point on the light incident region 23a of the diffractive element 23.

As shown in FIG. 6, the field angle θ can be defined by Equation (1), and the beam diameter r can be defined by Equation (2).

$$\theta = a\tan(a/f) \quad \text{Equation (1)}$$

$$r = f \cdot \tan\theta_L \quad \text{Equation (2)}$$

From Equations (1) and (2), when the focal length f of the collimating lens 22 is increased, the beam diameter r is increased although the field angle θ can be reduced, resulting in an increase in product size.

Moreover, the light L emitted from the solid-state light source 21 of the embodiment has anisotropy in the distribution of emission angle.

Here, conversion of the light L to parallel light using a collimating lens having a rotationally symmetric shape about the optical axis will be described as a comparative example.

Table 1 below shows results of calculation of the field angle θ and the beam diameter r from Equations (1) and (2), obtained when the collimating lens (lens having a rotationally symmetric shape) of the comparative example is used. Table 1 shows calculation results of the focal length f, the emission angle $\theta_L$, a beam width R (twice the beam diameter r), the emission point size a (the size of the light emitting region 21a), and the field angle θ in the long-side direction W1 and the short-side direction W2 of the light emitting region 21a of the solid-state light source 21.

TABLE 1

|  | Short-Side Direction W2 | Long-Side Direction W1 |
|---|---|---|
| Focal Length: f | 4.8 mm | 4.8 mm |
| Light Source Emission Angle: θL | 45 deg | 9 deg |
| Beam Diameter: r | 4.0 mm | 0.8 mm |
| Emission Point Size: a | 1 μm | 40 μm |
| Field Angle: θ | 0.006 deg | 0.24 deg |

As shown in Table 1, when the collimating lens 22A having a rotationally symmetric shape is used, the focal lengths f in the long-side direction W1 and the snort-side direction W2 are both 4.8 mm and equal to each other. When the collimating lens 22A having a rotationally symmetric shape is used, the beam diameter r and the field angle θ in the long-side direction W1 are different from those in the short-side direction W2.

Figure 7:
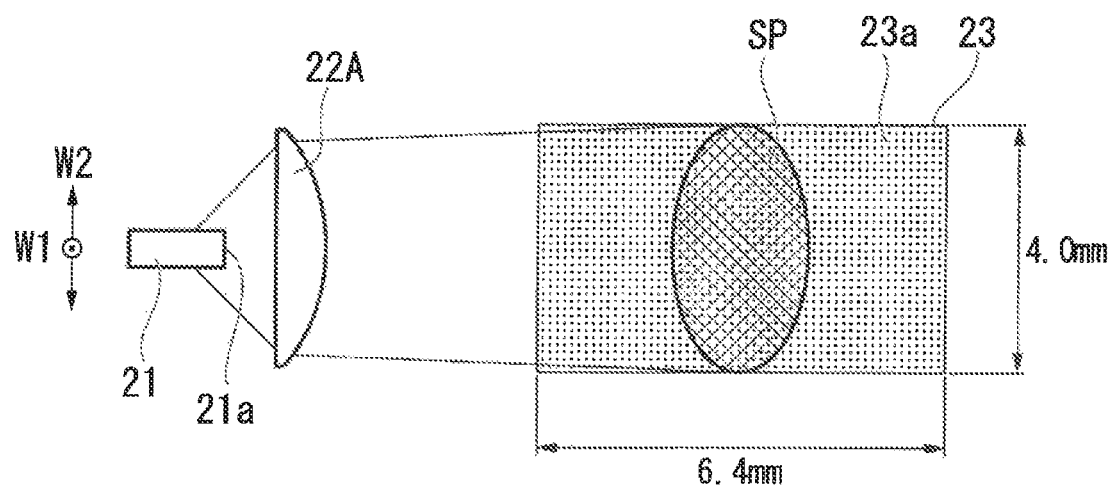
FIG. 7 is a diagram showing a spot formed by a collimating lens of a comparative example.

FIG. 7 is a diagram showing a spot SP formed on the diffractive element 23 by the light L transmitted through the collimating lens 22A according to the comparative example. In FIG. 7, it is assumed that the solid-state light source 21 and the diffractive element 23 are disposed such that the short-side direction W2 of the light emitting region 21a coincides with the short-side direction of the light incident region 23a of the diffractive element 23.

As shown in FIG. 7, the spot SP having a substantially elliptical shape with a length of 4.0 mm in the long-axis direction and a length of 0.8 mm in the short-axis direction is formed on the light incident region 23a of the diffractive element 23. Although the size of the spot SP in the short-side direction of the light incident region 23a is sufficient, the size of the spot SP in the long-side direction of the light incident region 23a is small. Therefore, the light incident region 23a cannot be effectively used.

The present inventor has found that when the field angle θ of the light L incident on the diffractive element 23 is greater than 0.03 degrees, the above-described shift of the diffraction image remarkably occurs. However, although the field angle θ of the light L is sufficiently small (0.006 degrees) in the short-side direction W2, the field angle θ is very large (0.24 degrees) in the long-side direction W1.

As described above, when the collimating lens 22A having a rotationally symmetric shape is used, light use efficiency is low and it is difficult to reduce the shift of the diffraction image.

In contrast, in the embodiment, the collimating lens 22 including a first lens 25 having a first lens surface 25a, and a second lens 26 having a second lens surface 26a is used as shown in FIG. 5.

The first lens 25 having the first lens surface 25a is a surface that corresponds to the long-side direction W1 of the light L, functions as a cylindrical lens in a plane parallel to the long-side direction W1, and collimates the light L emitted from the light emitting region 21a in a plane parallel to the XY plane. That is, the first lens surface 25a includes a cylindrical surface having a generating line in the long-side direction W1, and collimates the light L spreading in the long-side direction W1.

The second lens 26 having the second lens surface 26a is a surface that corresponds to the short-side direction W2 of the light L, functions as a cylindrical lens in a plane parallel to the short-side direction W2, and collimates the light L emitted from the light emitting region 21a in a plane parallel to the YZ plane. That is, the second lens surface 26a includes a cylindrical surface having a generating line in the short-side direction W2, and collimates the light L spreading in the short-side direction W2.

As the collimating lens 22, a collimating lens composed of one lens having the first lens surface 25a on one surface side and having the second lens surface 26a on the other surface side may be used.

Subsequently, conversion of the light L to parallel light using the collimating lens 22 of the embodiment will be described.

Table 2 and Table 3 below show results of calculation of the field angle θ and the beam diameter r from Equations (1) and (2), obtained when the collimating lens 22 of the embodiment is used.

Tables 2 and 3 show calculation results of the focal length f, the emission angle $\theta_L$, the beam width R (twice the beam diameter r), the emission point size a (the size of the light emitting region 21a), and the field angle θ in the long-side direction W1 and the short-side direction W2 of the light emitting region 21a of the solid-state light source 21.

Under the calculation conditions shown in Table 2, the solid-state light source 21 and the diffractive element 23 are disposed such that the long-side direction W1 of the light emitting region 21a coincides with the short-side direction of the light incident region 23a of the diffractive element 23. On the other hand, under the calculation conditions shown in Table 3, the solid-state light source 21 and the diffractive element 23 are disposed such that the short-side direction W2 of the light emitting region 21a coincides with the short-side direction of the light incident region 23a of the diffractive element 23. That is, there is a 90-degree difference in the arrangement of the solid-state light source 21 with respect to the diffractive element 23 between the conditions shown in Table 2 and the conditions shown in Table 3.

TABLE 2

|  | Short-Side Direction W2 | Long-Side Direction W1 |
| --- | --- | --- |
| Focal Length: f | 4.8 mm | 40.5 mm |
| Light Source Emission Angle: $\theta_L$ | 45 deg | 9 deg |
| Beam Diameter: r | 4.0 mm | 6.4 mm |
| Emission Point Size: a | 1 μm | 40 μm |
| Field Angle: θ | 0.006 deg | 0.03 deg |

TABLE 3

|  | Short-Side Direction W2 | Long-Side Direction W1 |
| --- | --- | --- |
| Focal Length: f | 7.7 mm | 25.5 mm |
| Light Source Emission Angle: $\theta_L$ | 45 deg | 9 deg |
| Beam Diameter: r | 6.4 mm | 4.0 mm |
| Emission Point Size: a | 1 μm | 40 μm |
| Field Angle: θ | 0.004 deg | 0.04 deg |

In the collimating lens 22 shown in Table 2, the focal length (25.5 mm) of the first lens surface 25a corresponding to the light L spreading in the long-side direction W1 is made longer than the focal length (7.7 mm) of the second lens surface 26a corresponding to the light L spreading in the short-side direction W2.

Figure 8:
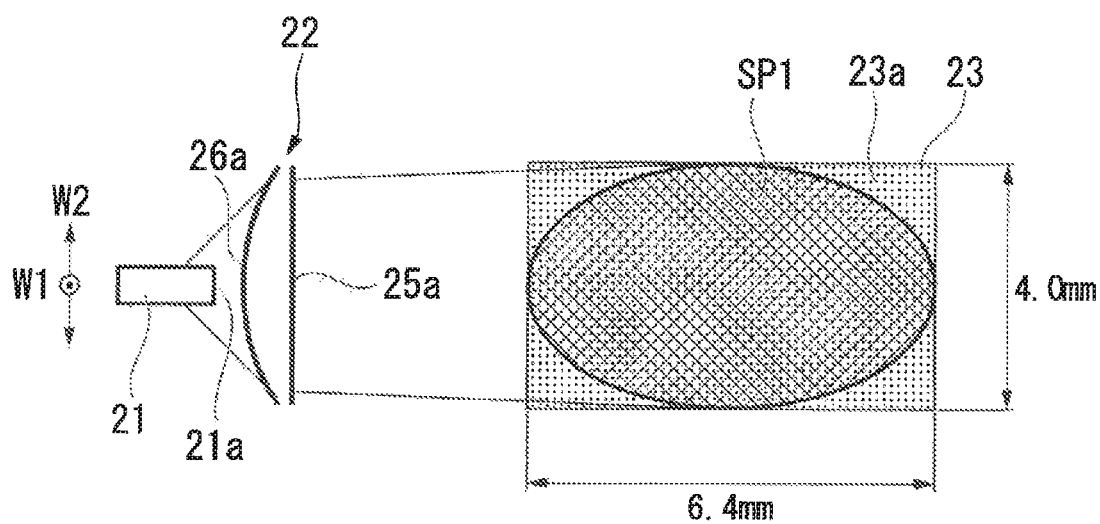
FIG. 8 is a diagram showing a spot formed by a collimating lens under the conditions shown in Table 2.

FIG. 8 is a diagram showing a spot SP1 formed on the diffractive element 23 by the light L transmitted through the collimating lens 22 shown in Table 2.

As shown in FIG. 8, the spot SP1 having a substantially elliptical shape with a length of 6.4 mm in the long-axis direction and a length of 4.0 mm in the short-axis direction is formed on the diffractive element 23. The spot SP1 is sufficiently large in the long-side direction of the light incident region 23a compared to the spot SP of the comparative example. Therefore, the entire region of the light incident region 23a can be used, and thus a desired diffraction pattern can be formed.

Moreover, the field angle θ of the light L can be reduced to as small as 0.006 degrees in the short-side direction W2. However, the field angle θ of the light L in the long-side direction W1 is 0.04 degrees, which is slightly greater than 0.03 degrees. Therefore, the effect of reducing the shift of the diffraction image is lowered.

In the collimating lens 22 shown in Table 3, on the other hand, the focal length ($f_1$ shown in FIG. 5, 40.5 mm) of the first lens surface 25a corresponding to the light L spreading in the long-side direction W1 is made longer than the focal length ($f_2$ shown in FIG. 5, 4.8 mm) of the second lens surface 26a corresponding to the light L spreading in the short-side direction W2.

Here, when the emission angle of the light L emitted from the solid-state light source 21 is large, if the focal length (distance between the solid-state light source 21 and a lens) is not reduced, the lens is increased in size by that amount. Therefore, the focal length of the lens corresponding to the light having a large emission angle is preferably reduced. In the embodiment, the focal length $f_2$ of the second lens 26 (the second lens surface 26a) corresponding to the short-side direction W2 of the light emitting region 21a, in which the emission angle is large and the field angle is small, is reduced; therefore, even if the focal length is relatively reduced, the field angle is less likely to increase. Thus, it is possible to miniaturize the second lens 26 without increasing the field angle in the short-side direction W2 of the light emitting region 21a.

Moreover, in order to reduce the field angle in the long-side direction W1 of the light emitting region 21a to a small value, the focal length (distance between the solid-state light source 21 and a lens) is increased. In the embodiment, the emission angle in the long-side direction W1 of the light emitting region 21a is small; therefore, even when the focal length of the lens (the first lens 25 having the first lens surface 25a) corresponding to the long-side direction W1 is increased, the first lens 25 is less likely to increase in size. Thus, it is possible to miniaturize the first lens 25 without increasing the field angle in the long-side direction W1 of the light emitting region 21a.

Hence, according to the embodiment, the lenses 25 and 26 constituting the collimating lens 22 can be miniaturized.

Figure 9:
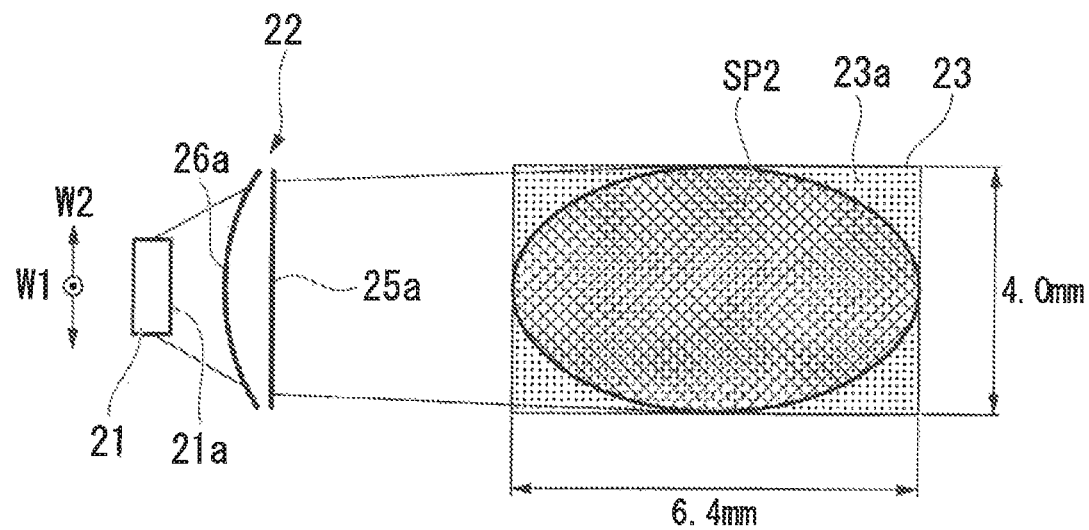
FIG. 9 is a diagram showing a spot formed by a collimating lens under the conditions shown in Table 3.

FIG. 9 is a diagram showing a spot SP2 formed on the diffractive element 23 by the light L transmitted through the collimating lens 22 shown in Table 3.

As shown in FIG. 9, the spot SP2 having a substantially elliptical shape with a length of 6.4 mm in the long-axis direction and a length of 4.0 mm in the short-axis direction is formed on the diffractive element 23. Similarly to the spot SP1, the spot SP2 can use the entire region of the light incident region 23a, and thus a desired diffraction pattern can be formed.

Moreover, the field angles θ of the light L in the short-side direction W2 and the long-side direction W1 are respectively 0.006 degrees and 0.03 degrees, which can be both reduced to small values. Thus, as can be seen from Table 3, when the solid-state light source 21 and the diffractive element 23 are disposed such that the short-side direction W2 of the light emitting region 21a coincides with the short-side direction of the light incident region 23a of the diffractive element 23, the shift of the diffraction image can be reduced.

As described above, in the illumination device 2 of the embodiment, the solid-state light source 21 and the diffractive element 23 are disposed such that the short-side direction W2 of the light emitting region 21a coincides with the short-side direction of the light incident region 23a of the diffractive element 23, so as to satisfy the conditions shown in Table 3.

According to the illumination device 2 of the embodiment, an increase in the size of the lenses 25 and 26 constituting the collimating lens 22 can be suppressed, and also, the light L can be favorably incident on the entire region of the light incident region 23a by reducing the field angle θ of the light L to 0.03 degrees or less. Thus, a predetermined region of the light modulator 4R, 4G, or 4B can be illuminated with a desired diffraction pattern by reducing the shift of the diffraction image. Moreover, light absorption by the polarizer is reduced and thus a thermal load is reduced; therefore, the reliability of the light modulators 4R, 4G, and 4B can be improved.

According to the projector 1 of the embodiment, a bright image can be displayed because the projector 1 includes the illumination device 2 and thus has high light-use efficiency. Moreover, the light emitted onto dark pixels in the light modulators 4R, 4G, and 4B is darkened, and the light emitted onto bright pixels is brightened; therefore, a high contrast image can be displayed.

Although the illumination device 2 of the embodiment, which includes one solid-state light source 21, has been exemplified, the number of solid-state light sources 21 is not limited to this. That is, the illumination device 2 may include a plurality of solid-state light sources 21.

Table 4 below shows results of calculation of the field angle θ and the beam diameter r from. Equations (1) and (2), obtained when a plurality of solid-state light sources 21 are used. Under the calculation conditions shown in Table 4, the solid-state light source 21 and the diffractive element 23 are disposed such that the short-side direction W2 of the light emitting region 21a coincides with the short-side direction of the light incident region 23a of the diffractive element 23.

TABLE 4

| | Short-Side Direction W2 | Long-Side Direction W1 |
|---|---|---|
| Focal Length: f | 1 mm | 40.5 mm |
| Light Source Emission Angle: $\theta_L$ | 45 deg | 9 deg |
| Beam Diameter: r | 0.8 mm | 6.4 mm |
| Emission Point Size: a | 1 μm | 40 μm |
| Field Angle: θ | 0.03 deg | 0.03 deg |

As shown in Table 4, in order to improve output of the illumination device 2, the focal length of the second lens surface 26a corresponding to the short-side direction W2 in which the field angle is as sufficiently small as 0.006 mm is reduced, and the plurality of solid-state light sources 21 are arranged in the short-side direction W2.

For example, the focal length (1 mm) of the second lens surface 26a corresponding to the light L spreading in the short-side direction W2 is set so as to confine the field angle θ of the light L in the short-side direction W2 to 0.03 degrees or less at which the shift of the diffraction image is not affected. In this case, five solid-state light sources 21 can be disposed in the vertical direction (the Z-direction shown in FIG. 2).

Figure 10:
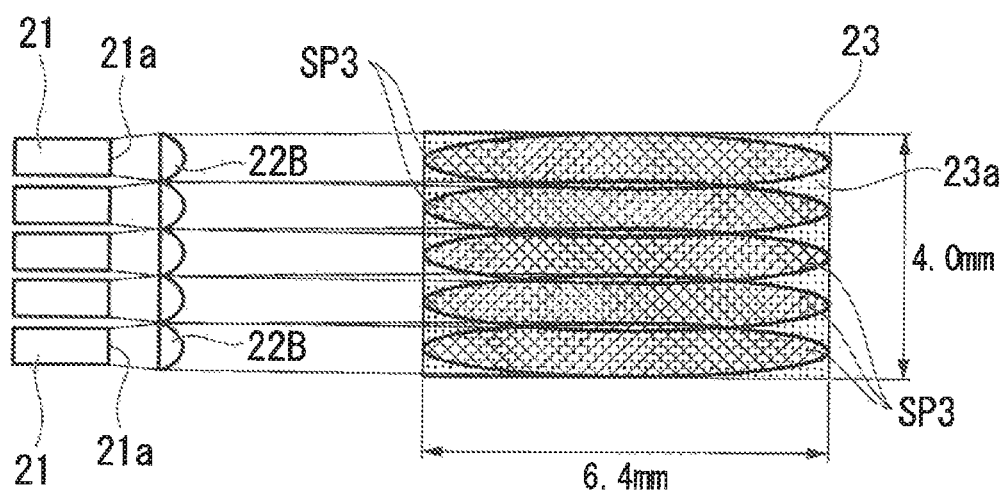
FIG. 10 is a diagram showing spots formed by collimating lenses under the conditions shown in Table 4.

FIG. 10 is a diagram showing spots SP3 formed on the diffractive element 23 by the light L transmitted through collimating lenses 22B shown in Table 4.

As shown in FIG. 10, five spots SP3 each having a substantially elliptical shape with a length of 6.4 mm in the long-axis direction and a length of 0.8 mm in the short-axis direction are formed on the diffractive element 23. According to the configuration as described above, the five spots SP3 are formed on the light incident region 23a, and thus the entire region of the light incident region 23a can be effectively used.

Although the plurality of solid-state light sources 21 arranged in a row along the short-side direction W2 have been exemplified in the above description, the solid-state light sources 21 may be arranged along each of the short-side direction W2 and the long-side direction W1. In this case, it is desirable that the number of solid-state light sources arranged in the short-side direction W2 is larger than the number of solid-state light sources 21 arranged in the long-side direction W1.

Figure 11:
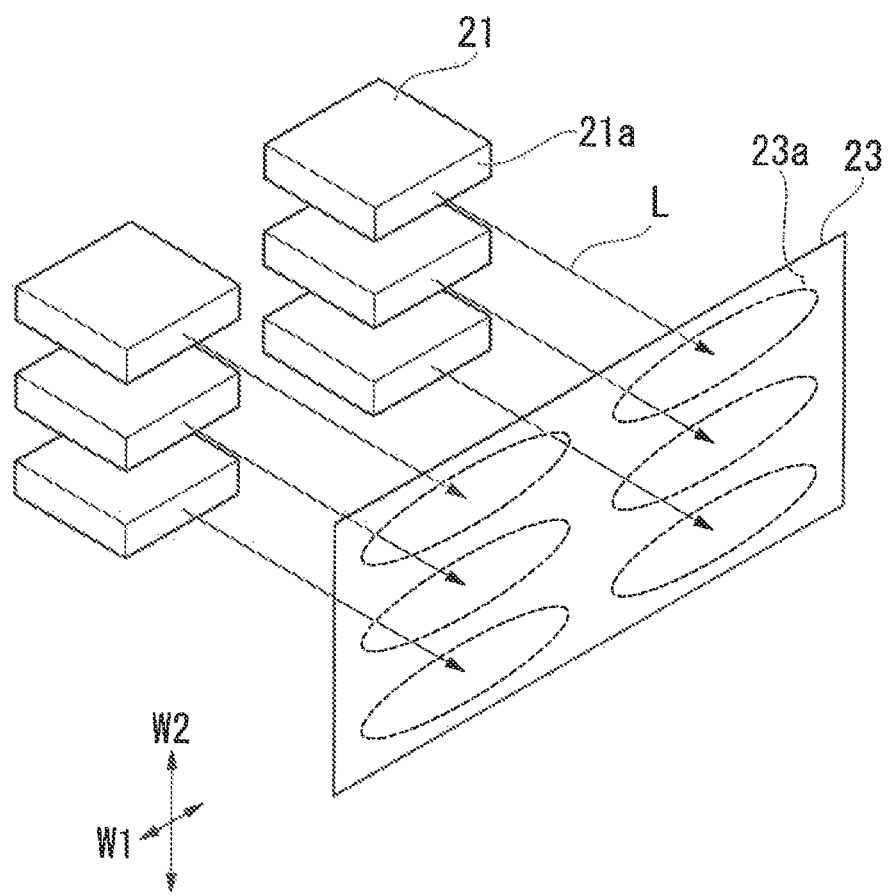
FIG. 11 is a schematic configuration diagram showing an arrangement of solid-state light sources according to a modified example.

For example, in the case of arranging six solid-state light sources 21 as shown in FIG. 11, the number of solid-state light sources 21 arranged in the short-side direction W2 of the light emitting region 21a is set to three, and the number of solid-state light sources 21 arranged in the long-side direction W1 of the light emitting region 21a is set to two. With this configuration, it is possible to improve output of the light L incident on the light incident region 23a while reducing the field angle of the light L.

Second Embodiment

Subsequently, a projector of a second embodiment will be described. Configurations common to the first embodiment are denoted by the same reference numerals and signs, and a detailed description of the configurations is omitted.

Figure 12:
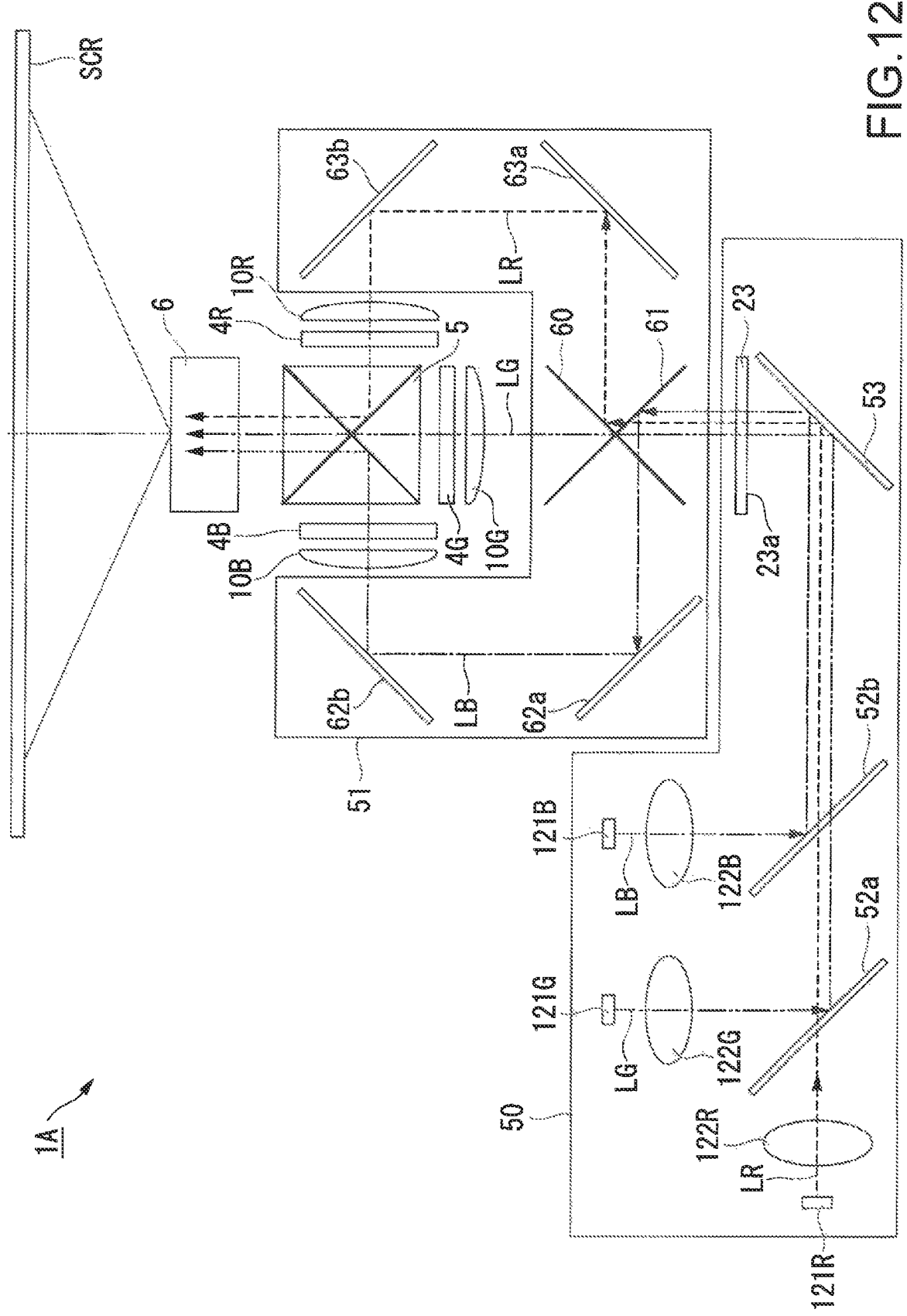
FIG. 12 is a schematic configuration diagram showing a projector of a second embodiment.

FIG. 12 is a schematic configuration diagram showing the projector of the second embodiment.

As shown in FIG. 12, the projector 1A of the embodiment includes an illumination device 50, a light separating unit 51, the light modulator 4R, the light modulator 4G, the light modulator 4B, the light combining optical system 5, and the projection optical system 6.

The illumination device 50 includes a first solid-state light source 121R, a second solid-state light source 121G, a third solid-state light source 121B, a first collimating lens 122R, a second collimating lens 122G, a third collimating lens 122R, dichroic mirrors 52a and 52b, a mirror 53, and the diffractive element 23.

The basic configurations of the solid-state light sources 121R, 121G, and 121B, and the collimating lenses 122R, 122G, and 122B are the same as those of the solid-state light source 21 and the collimating lens 22 of the first embodiment.

In the embodiment, the first solid-state light source 121R includes a laser diode that emits laser light of red light LR; the second solid-state light source 121G includes a laser diode that emits laser light of green light LG; and the third solid-state light source 121B includes a laser diode that emits laser light of blue light LB.

The first collimating lens 122R, the second collimating lens 122G, and the third collimating lens 122B respectively correspond to the first solid-state light source 121R, the second solid-state light source 121G, and the third solid-state light source 121B.

The dichroic mirror 52a has the optical characteristics of transmitting the red light LR from the first solid-state light source 121R and reflecting the green light LG from the second solid-state light source 121G. The dichroic mirror 52b has the optical characteristics of transmitting the red light LR and the green light LG and reflecting the blue light LB from the third solid-state light source 121B. The mirror 53 reflects the red light LR, the green light LG, and the blue light LB to cause the red light LR, the green light LG, and the blue light LB to be incident on the diffractive element 23.

The diffractive element 23 converts the red light LR, the green light LG, and the blue light LB into a diffraction pattern corresponding to a display image of the light modulators 4R, 4G, and 4B similarly to the first embodiment.

The light separating unit 51 separates the red light LR, the green light LG, and the blue light LB converted into the desired diffraction pattern by the diffractive element 23, and directs the red light LR, the green light LG, and the blue light LB to the light modulators 4R, 4G, and 4B.

The light separating unit 51 includes a first dichroic mirror 60, a second dichroic mirror 61, and mirrors 62a, 62b, 63a, and 63b.

The first dichroic mirror 60 reflects the red light LR and transmits the green light LG and the blue light LB. The second dichroic mirror 61 is provided so as to intersect the first dichroic mirror 60, reflects the blue light LB, and transmits the red light LR and the green light LG.

The red light LR reflected by the first dichroic mirror 60 is reflected by the mirrors 63a and 63b sequentially, and is incident on the light modulator 4R through the field lens 10R. The blue light LB reflected by the second dichroic mirror 61 is reflected by the mirrors 62a and 62b sequentially, and is incident on the light modulator 4B through the field lens 10B. The green light LG transmitted through the first dichroic mirror 60 and the second dichroic mirror 61 is incident on the light modulator 4G through the field lens 10G.

According to the illumination device 50 of the embodiment, it is possible to cause the red light LR, the green light LG, and the blue light LB to be favorably incident on the light incident region 23a of the diffractive element 23 while reducing the field angle. Thus, predetermined regions of the light modulators 4R, 4G, and 4B can be illuminated with a desired diffraction pattern by reducing the shift of the diffraction image. Moreover, light absorption by the polarizer is reduced and thus a thermal load is reduced; therefore, the reliability of the light modulators 4R, 4G, and 4B can be improved.

Hence, according to the projector 1A of the embodiment, a bright image can be displayed because the projector 1A includes the illumination device 50 and thus has high light-use efficiency.

Third Embodiment

Subsequently, a projector of a third embodiment will be described. Configurations common to the second embodiment are denoted by the same reference numerals and signs, and a detailed description of the configurations is omitted.

Figure 13:
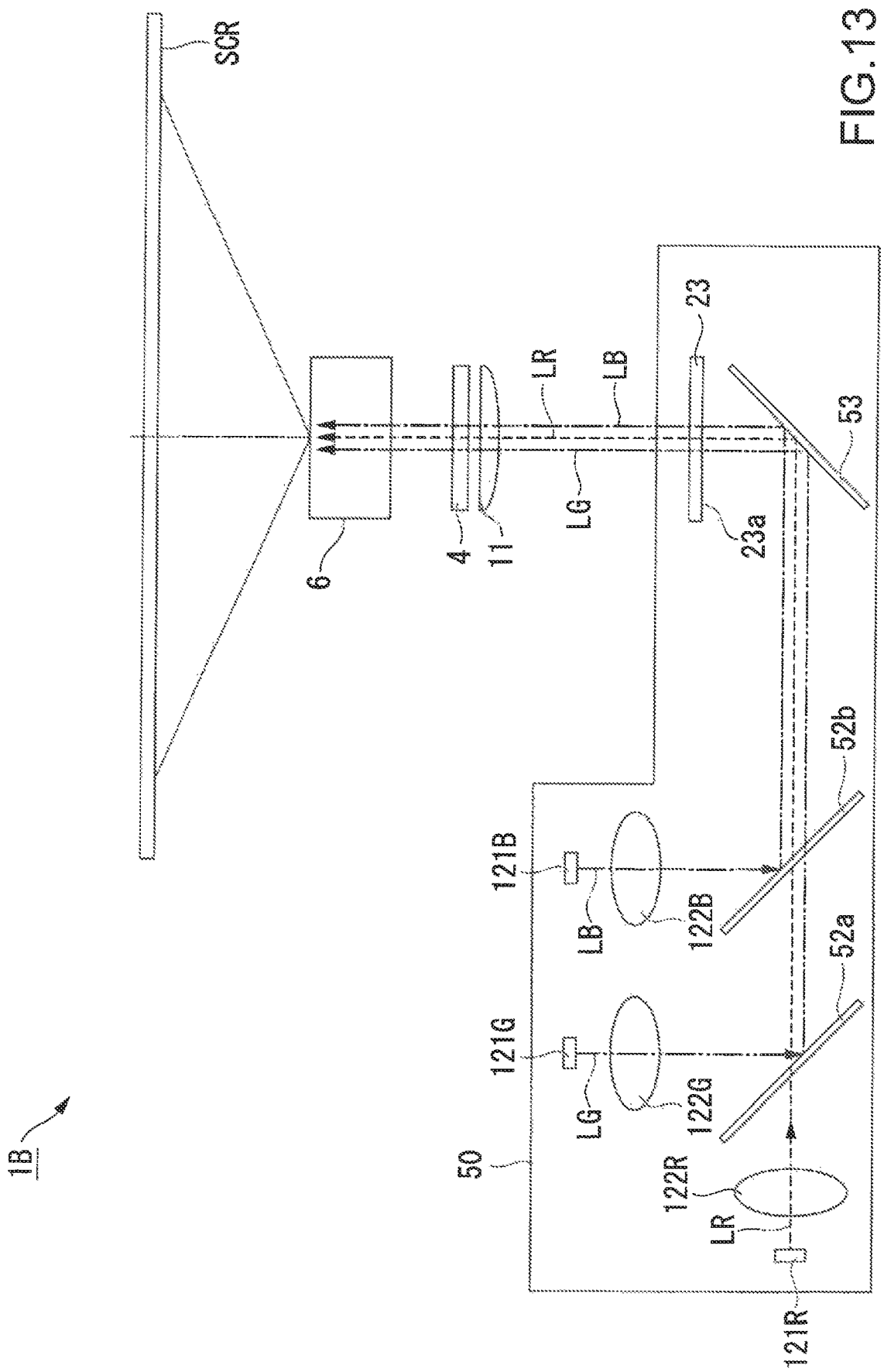
FIG. 13 is a schematic configuration diagram showing a projector of a third embodiment.

FIG. 13 is a schematic configuration diagram showing the projector of the third embodiment.

As shown in FIG. 13, the projector 1B of the embodiment includes the illumination device 50, a field lens 11, a light modulator 4, and the projection optical system 6.

The third embodiment differs from the second embodiment in that the third embodiment includes only one light modulator 4. In the embodiment, the first solid-state light source 121R, the second solid-state light source 121G, and the third solid-state light source 121B are driven in a time-division manner.

The diffractive element 23 is time-sequentially driven so as to form a diffraction pattern according to incident light (the red light LR, the green light LG, or the blue light LB). The light modulator 4 is driven so as to modulate an image corresponding to the incident light (the red light LR, the green light LG, or the blue light LB).

According to the projector 1B of the embodiment, the number of light modulators can be reduced compared to the configuration of the second embodiment. Thus, a device configuration becomes simple, and therefore, it is possible to reduce costs and miniaturize the device.

Fourth Embodiment

Subsequently, a projector of a fourth embodiment will be described. Configurations common to the embodiments are denoted by the same reference numerals and signs, and a detailed description of the configurations is omitted.

Figure 14:
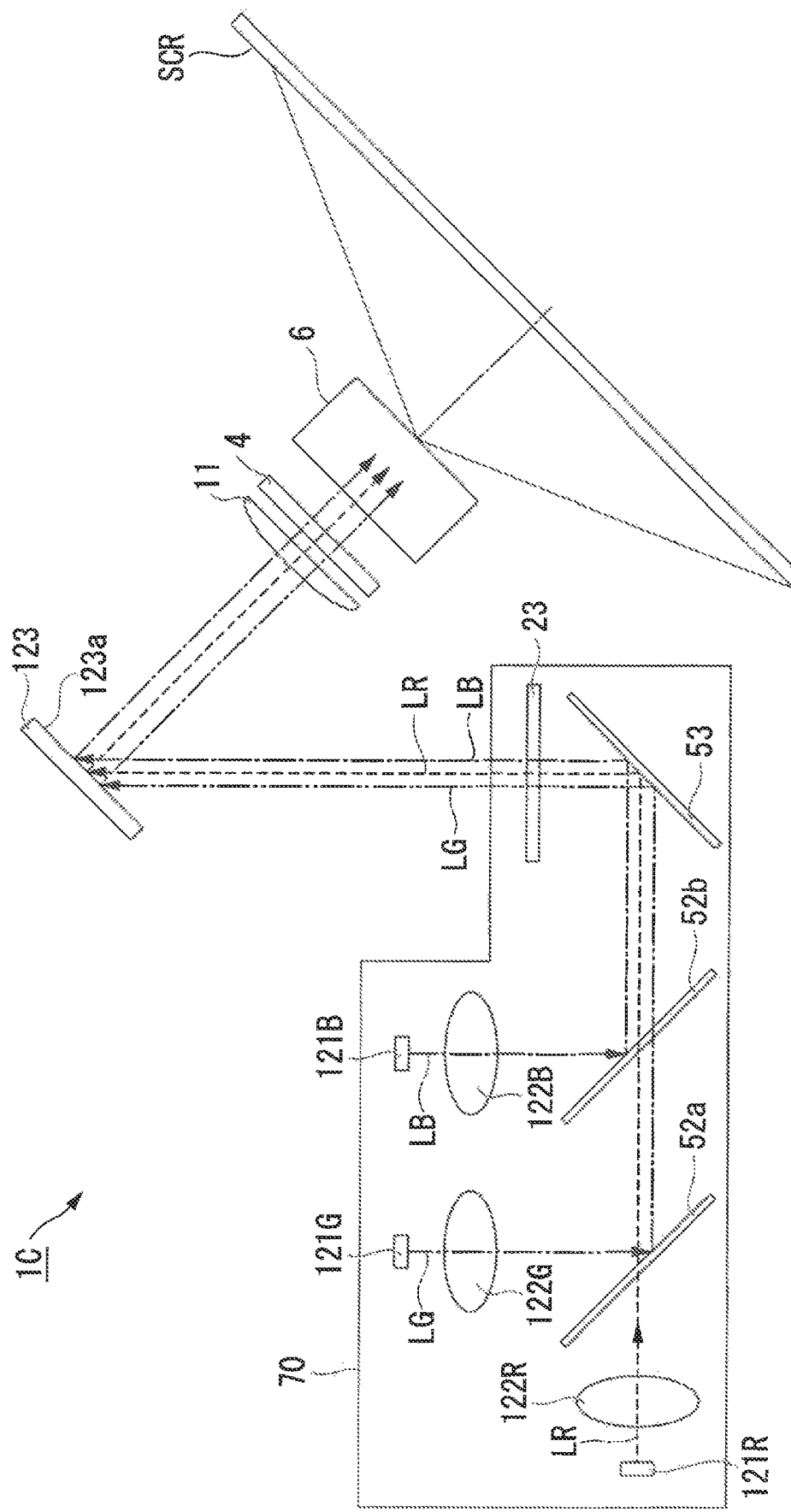
FIG. 14 is a schematic configuration diagram showing a projector of a fourth embodiment.

FIG. 14 is a schematic configuration diagram showing the projector of the fourth embodiment.

As shown in FIG. 14, the projector 1C of the embodiment includes an illumination device 70, the field lens 11, the light modulator 4, and the projection optical system 6.

The illumination device 70 of the embodiment includes the first solid-state light source 121R emitting the red light LR, the second solid-state light source 121G emitting the green light LG, the third solid-state light source 121B emitting the blue light LB, the first collimating lens 122R, the second collimating lens 122G, the third collimating lens 122B, the dichroic mirrors 52a and 52b, the mirror 53, and a diffractive element 123.

The mirror 53 reflects the red light LR, the green light LG, and the blue light LB to cause the red light LR, the green light LG, and the blue light LB to be incident on the diffractive element 123. The diffractive element 123 of the embodiment includes a liquid crystal panel including a plurality of pixel regions (diffraction regions) in which liquid crystal molecules are sealed between a pair of glass plates through pixel electrodes having light reflectivity such as aluminum. In this case, a diffraction grating using the liquid crystal molecules is formed in each of the pixel regions by applying a voltage to a predetermined pixel electrode.

That is, the diffractive element 123 of the embodiment differs from the diffractive element 23 of the embodiment described above in that the diffractive element 123 includes a reflective liquid crystal panel (reflective liquid crystal device). The diffractive element 123 acts similarly to the diffractive element 23, except that the diffractive element 123 includes the reflective liquid crystal panel. Therefore, the diffractive element 123 is configured such that a diffraction angle in each of the diffraction regions can be controlled by adjusting a voltage to be applied.

In the embodiment, similarly to the third embodiment, the first solid-state light source 121R, the second solid-state light source 121G, and the third solid-state light source 121B are driven in a time-division manner. The diffractive element 123 is time-sequentially driven so as to form a diffraction pattern according to the red light LR, the green light LG, or the blue light LB (hereinafter sometimes referred to as "incident light L1"). The light modulator 4 is driven so as to modulate an image corresponding to the incident light L1.

Now, the diffractive element 123 of the embodiment is of a reflective structure, and therefore, the incident light L1 needs to be incident obliquely on a light incident region 123a.

Here, a phase difference S occurring in light (diffracted light) emitted from the diffractive element 123 of a reflective structure can be defined by $S = \Delta n \cdot 2d$ where d is the thickness (cell gap) of a liquid crystal layer of the liquid crystal panel constituting the diffractive element 123 and $\Delta n$ is the refractive index difference due to the diffractive element 123.

Figure 15:
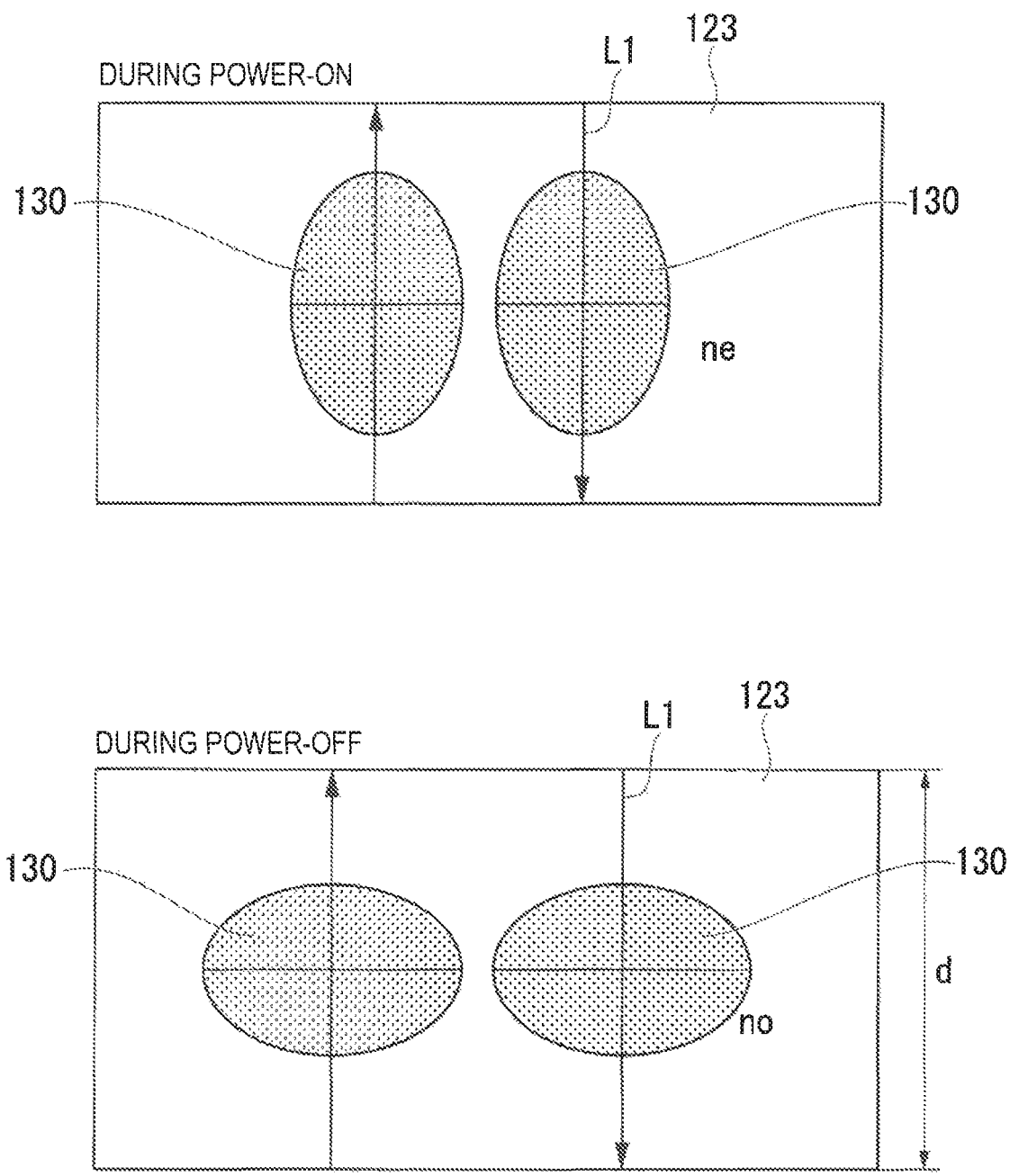
FIG. 15 is an explanatory view of a phase difference occurring when light is normally incident on a diffractive element.

Here, normal incidence of the incident light L1 on the diffractive element 123 will be described. FIG. 15 is a diagram for explaining the phase difference occurring when the incident light L1 is normally incident on the diffractive element 123. FIG. 15 shows the state of liquid crystal molecules (index ellipsoids) 130 of the diffractive element 123 during power-on and power-off. In FIG. 15, $n_o$ is an ordinary light refractive index, and $n_e$ is an extraordinary light refractive index.

As shown in FIG. 15, the refractive index difference Δn in normal incidence is defined by ($n_o$−$n_e$). Commonly, ($n_o$−$n_e$) is set to 2π. That is, the refractive index difference Δn is constant in normal incidence, and therefore, the phase difference in the incident light L1 can be easily controlled.

In contrast, in the embodiment, the incident light L1 is incident in an oblique direction on the diffractive element 123. Hereinafter, oblique incidence of the incident light on the diffractive element 123 will be described.

Figure 16:
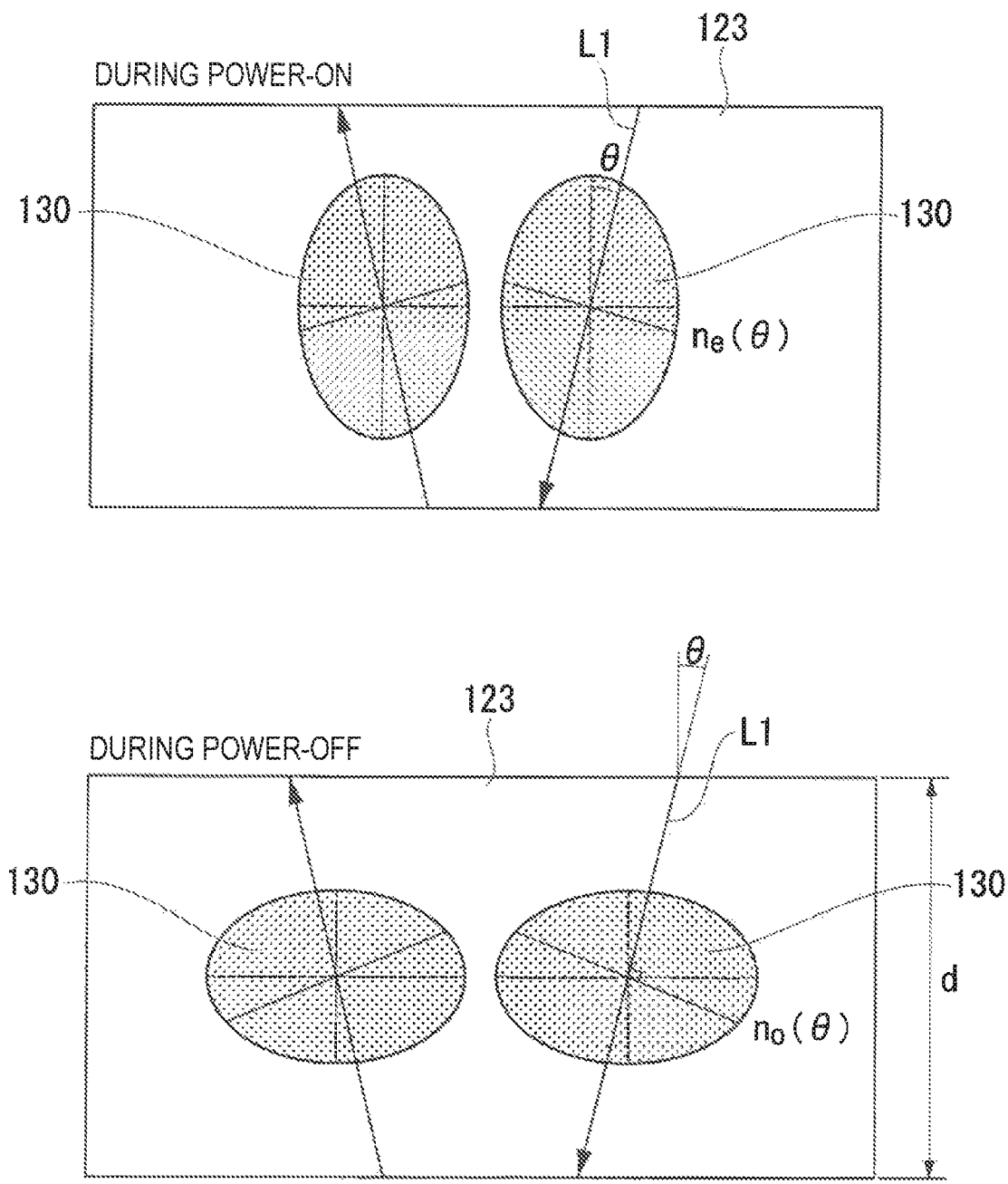
FIG. 16 is an explanatory view of a phase difference occurring when light is obliquely incident on the diffractive element.

FIG. 16 is a diagram for explaining the phase difference occurring when the incident light L1 is obliquely incident on the diffractive element 123. FIG. 16 shows the state of the liquid crystal molecules (index ellipsoids) 130 of the diffractive element 123 during power-on and power-off. In FIG. 16, $n_o(\theta)$ is an ordinary light refractive index, and $n_e(\theta)$ is an extraordinary light refractive index. In FIG. 16, it is assumed that refraction of light does not occur at the interface between the diffractive element 123 and air for simple description, and the incident angle of the incident light L1 with respect to the diffractive element 123 is θ.

As shown in FIG. 16, the refractive index difference Δn in oblique incidence is defined by ($n_o(\theta)$−$n_e(\theta)$). Here, $n_o(\theta)$ and $n_e(\theta)$ are both defined by the function of the incident angle θ. Therefore, the refractive index difference Δn varies according to the incident angle θ and therefore is not constant as in normal incidence, so that a desired phase difference cannot be obtained.

Thus, the diffractive element 123 cannot illuminate a predetermined region of the light modulator 4 with diffracted light, and as a result, a projected image of the projector 1C may be degraded in quality.

In contrast, in the diffractive element 123 of the embodiment, the thickness of the liquid crystal layer is set such that a phase difference Δnd in light passing through the liquid crystal layer during power-on and power-off is 2π. According to this configuration, also for the incident light L1 obliquely incident on the diffractive element 123, the phase difference can be adjusted within the range from 0 to 2π in each of the diffraction regions. With this configuration, the diffraction angle can be accurately controlled in each of the diffraction regions.

Hence, according to the illumination device 70 of the embodiment, a predetermined region of the light modulator 4 can be illuminated with a desired diffraction pattern. Thus, light absorption by the polarizer can be reduced. According to the projector 1C including the illumination device 70, a bright, high-quality image can be displayed because light use efficiency is high.

The invention is not limited to the details of the embodiments, and can be appropriately changed within the scope not departing from the spirit of the invention.

For example, in the embodiments, the liquid crystal panel has been exemplified as a diffractive element. That is, the phase difference Δnd is generated by varying the refractive index difference Δn in each of the plurality of diffraction regions, thereby controlling diffraction of light. It is sufficient that the diffractive element according to the invention can vary the phase difference, and the diffractive element is not limited to a liquid crystal panel. For example, diffraction of light may be controlled using a diffractive element that generates the phase difference by varying an optical path length for each of the plurality of diffraction regions instead of a refractive index.

The entire disclosure of Japanese Patent Application No. 2017-035978, filed Feb. 28, 2017 is expressly incorporated by reference herein.

What is claimed is:

1. A projector comprising:
a solid-state light source, wherein the solid-state source includes a rectangular light emitting region, an emission angle in a long-side direction of the light emitting region being smaller than an emission angle in a short-side direction of the light emitting region;
a diffractive element that dynamically controls diffraction of light from the solid-state light source;
a collimating lens that is disposed on an optical path between the solid-state light source and the diffractive element and collimates the light from the solid-state light source, wherein the collimating lens includes a first lens surface corresponding to the long-side direction of the light emitting region and a second lens surface corresponding to the short-side direction of the light emitting region;
a driver that selectively applies voltage to the diffractive element such that the diffractive element diffracts the light when the voltage is applied and does not diffract the light when the voltage is not applied;
a light modulator that modulates, in response to image information, diffracted light emitted from the diffractive element to generate image light; and
a projection optical system that projects the image light, wherein
the solid-state light source and the diffractive element are disposed such that the short-side direction of the light emitting region coincides with a short side direction of a light incident region of the diffractive element, the light incident region being rectangular.

2. The projector according to claim 1, wherein
a focal length of the first lens surface is longer than a focal length of the second lens surface.

3. The projector according to claim 1, wherein
the projector includes a plurality of the solid-state light sources, and
the plurality of solid-state light sources are arranged at least along the short-side direction of the light emitting region.

4. The projector according to claim 3, wherein
the plurality of solid-state light sources are arranged along the short-side direction and the long-side direction of the light emitting region, and
the number of the solid-state light sources arranged in the short-side direction is larger than the number of the solid-state light sources arranged in the long-side direction.

5. The projector according to claim 1, wherein
the driver controls a diffraction angle of the light through the diffractive element by adjusting the voltage applied to the diffractive element.

6. The projector according to claim 1, wherein
the diffractive element includes a plurality of diffraction regions on which the light is incident, and
the driver selectively controls each of the diffractive regions to form a diffracted light pattern.

7. The projector according to claim 1, wherein
a diffraction grating is formed on the diffractive element when the voltage is applied, and the diffraction grating is not formed on the diffractive element when the voltage is not applied.

\* \* \* \* \*